United States Patent [19]

Nocci et al.

[11] Patent Number: 4,762,893
[45] Date of Patent: Aug. 9, 1988

[54] BLOCK COPOLYMERS OF OLEFINES WITH VINYL AROMATIC MONOMERS

[75] Inventors: Roberto Nocci; Giancarlo Attalla, both of Novara; Luciano Del Giudice, Milan, all of Italy; Robert E. Cohen, Jamaica Plain, Mass.; Floriana Bertinotti, Novara, Italy

[73] Assignee: Montedison S.p.A., Milan, Italy

[21] Appl. No.: 812,376

[22] Filed: Dec. 23, 1985

Related U.S. Application Data

[63] Continuation of Ser. No. 513,630, Jul. 14, 1983, abandoned.

[30] Foreign Application Priority Data

Jul. 14, 1982 [IT] Italy .................. 22386 A/82

[51] Int. Cl.[4] .................................. C08L 297/08
[52] U.S. Cl. .......................... 525/323; 525/324; 525/88
[58] Field of Search ............ 525/324, 323, 268, 244

[56] References Cited

U.S. PATENT DOCUMENTS

| T866013 | 9/1969 | Shields et al. | 525/324 |
|---|---|---|---|
| 3,478,129 | 11/1969 | Kern et al. | 525/324 |
| 3,894,117 | 7/1975 | Agouri et al. | 525/98 |

FOREIGN PATENT DOCUMENTS

| 44-19252 | 8/1969 | Japan | 525/323 |
|---|---|---|---|
| 1245859 | 9/1971 | United Kingdom . | |

OTHER PUBLICATIONS

Langer—"New Chelated Organolithium Catalysts'-'-ACS Polymer Preprintes vol. 7, No. 1, 1966, pp. 132–139.

Manson et al—Polymer Blends and Composites—11/79, pp. 62.

*Primary Examiner*—Carman J. Seccuro
*Attorney, Agent, or Firm*—Stevens, Davis, Miller & Mosher

[57] ABSTRACT

Block copolymers of ethylene and/or alpha-olefins, in particular propylene, with vinyl aromatic monomers, comprising at least two polymeric blocks, one of which being a polyolefinic block and the other having a stereoregular structure and being formed by vinyl aromatic monomer units.

2 Claims, 1 Drawing Sheet

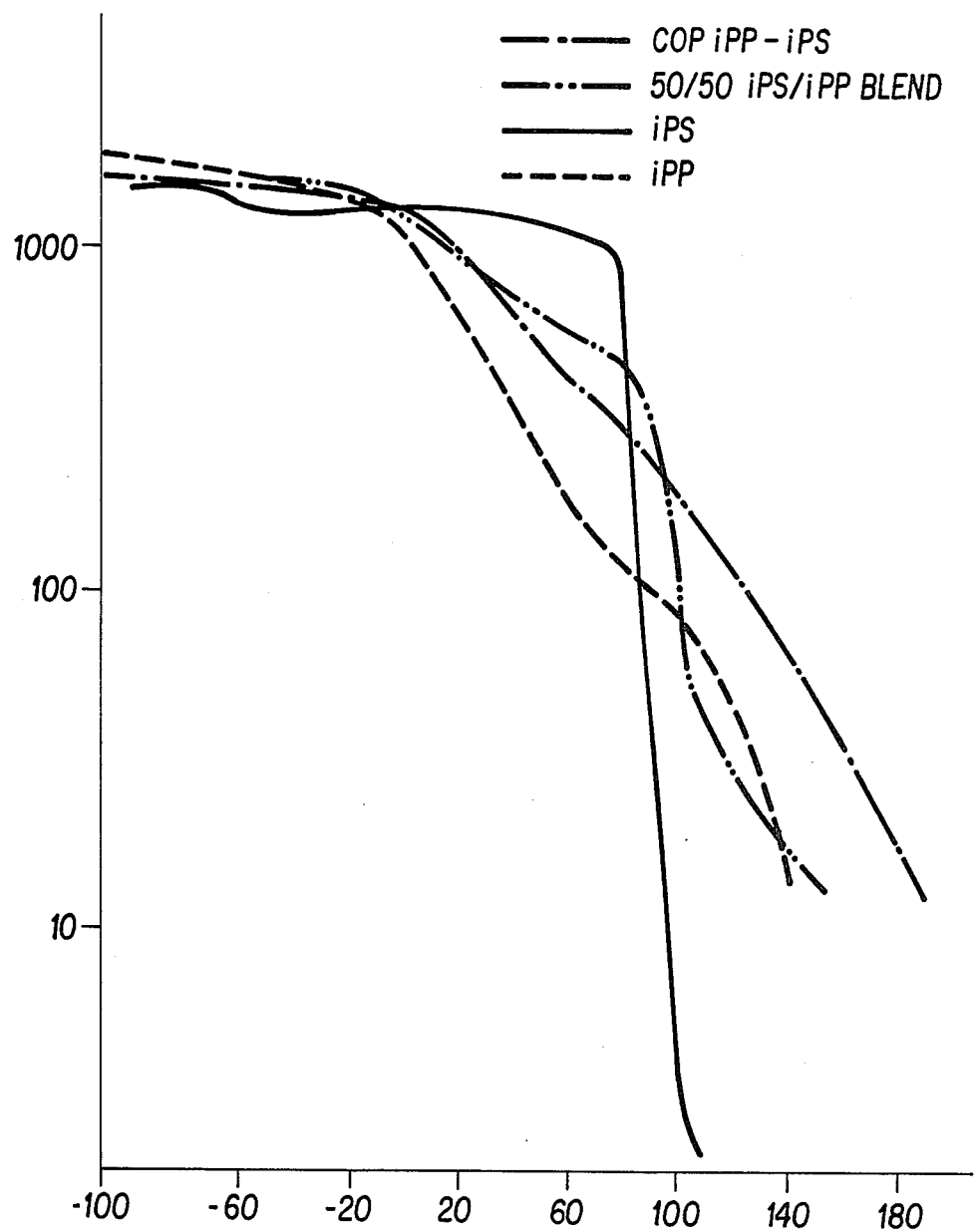

BLOCK COPOLYMERS OF OLEFINES WITH VINYL AROMATIC MONOMERS

This is a continuation of application Ser. No. 513,630, filed July 14, 1983, now abandoned.

BACKGROUND OF THE INVENTION

The copolymers of olefins with vinyl aromatic monomers, in particular styrene, known up to now are of the statistical type or are of the block type, in which, however, the polystyrenic block has an atactic structure. Considering the type of structure of the polystyrenic block, these copolymers do not show properties of practical interest. There is no knowledge up to now of block copolymers of styrene with alpha-olefins, in which the polystyrenic block has sufficiently long stereoregular structure with possibility, therefore, of producing crystallinity of polystyrenic type detectable by means of X-rays.

THE PRESENT INVENTION

The present invention concerns a new class of block copolymers of ethylene and/or alpha-olefins with vinyl aromatic monomers, the process for their preparation and their use, besides as thermoplastic materials, as compatibilizing agents in polymeric compositions.

More in particular the invention concerns crystalline block copolymers of olefins with vinyl aromatic monomers showing crystallinity at least of polyolefinic type, comprising at least two blocks each containing at least 50 monomeric units, one block being polyolefinic and the other formed by units deriving from the vinyl monomer and characterized by stereoregular structure.

More specifically the invention concerns bi-block copolymers of ethylene or propylene with styrene showing crystallinity both of polyolefinic type and polystyrenic type, formed by a polyolefinic block having isotactic structure when the recurrent monomeric unit is propylene, and by a polystyrenic block with isotactic structure as well.

It has been in fact surprisingly found that the raw polymer obtained by polymerization in subsequent steps of styrene and of an alpha-olefin, in particular propylene, with the use of particular catalysts and polymerization conditions, contains a fraction with structure of block copolymer comprising two blocks, one of which is polypropylenic with isotactic structure and the other polystyrenic with isotactic structure as well.

Similarly, if instead of alpha-olephin ethylene is polymerized, a raw polymer is obtained, from which, by fractionation with solvents, it is possible to separate a fraction with structure of block copolymer of ethylene and styrene, showing crystallinity of polyethylenic type and isotactic structure of the polystyrenic block.

Similar results are obtained by using vinyl aromatic monomers other than styrene, such as for instance ortho methyl styrene, ortho chlorostyrene and 1-vinylnaphthalene.

The conditions to obtain the block copolymers of the invention comprise, as first step, the polymerization of styrene or of the vinyl aromatic monomer performed in homogeneous liquid phase in the presence of a solvent in which the polymer of the vinyl aromatic monomer is at least swellable.

Aromatic hydrocarbons, such as benzene, xylene, toluene, are generally used as solvents.

Styrene itself can act as polymerizing medium.

The subsequent step is the polymerization of ethylene or of alpha-olefin performed in conditions in which practically there is no polymerization of styrene or of the vinyl aromatic monomer.

The catalysts used in the process are of the type supported on Mg halide.

They include at least a Ti compound supported on an anhydrous Mg halide in active form. In case of preparation of block copolymers of alpha-olefins, in order to obtain polyolefinic blocks with stereoregular possibly isotactic structure, supported catalysts with high stereospecificity are used.

Catalysts of the above mentioned type are well known in the literature.

Examples of these catalysts are reported in the patents U.S. Pat. Nos. 4,298,718; 3,803,105; 4,113,654; 3,953,414; 4,107,413; 4,107,414; 4,226,741.

It has been found that, working with the above mentioned supported catalysts, the polymerization of styrene or of the vinyl aromatic monomer easily occurs at temperatures lower than about 50° C., while working at higher temperatures the yield in polymer rapidly decreases to negligible values.

Independently from the type of catalyst used (highly stereospecific, or not showing stereospecificity in the polymerization of propylene) the polystyrene which is obtained has mainly isotactic structure.

The polymerization of ethylene and alpha olefins easily occurs at temperatures exceeding 50° C. also working in presence of the solvents used in the polymerization of vinyl aromatic monomers.

As far as composition is concerned, the copolymers contain from 10 to 90% of units deriving from ethylene or alpha-olefin and from 90 to 10% of units deriving from vinyl aromatic monomer. Particularly interesting properties have been found in copolymers containing 30-70% in weight of units deriving from the olefinic monomer and 70-30% in weight of units deriving from the vinyl aromatic monomer. The copolymers of the invention present physical and mechanical properties very different from those of the copolymers known up to now and definitely better than those of the mixtures of the corresponding homopolymers.

The properties of the copolymers are in some respects better than those of homopolymers themselves.

As already mentioned, these block copolymers find application in particular as compatibilizing agents of mixtures: crystalline polymers of olefins with polymers of vinyl monomers which, as known, are not compatible with each other. Particularly interesting results are obtained by using two-block copolymers. More specifically, they find application as compatibilizing agents in compositions comprising polyethylene or isotactic polypropylene and polystyrene. In such compositions the compatibilizing effect is already present with quantities of copolymer of 5% by weight with respect to homopolymers. The block copolymers of the invention act in two directions, both decreasing the size of the domains of the dispersed phase and creating a link with the metrix. This is a consequence of the simultaneos presence in the chain of two segments which, chemically equal to the two main components, establish continuity which, when steric identity exists besides the chemical one, is stabilized by the participation of the segments of the copolymeric chain to the crystalline areas of the corresponding homopolymers which form the mixture.

It is known that compatibility between polymers is present rather frequently in case of amorphous polymers.

On the contrary, it is very infrequent to find cases of compatibility, at molecular level, in mixtures of polymers in which one or both the componenets are semicrystalline polymers and no case is known in which compatibility is reached without affecting the kinetics of crystallization and/or the percentage of crystallinity, to which many characteristics of applicative interest of the crystallizable polymers have to be attributed. As a matter of fact the rare cases of real miscibility in thermodynamic sense can be attributed to solubilization of the amorphous phases.

Only a few couples of polymers give, in limited ranges of concentration, evidence of cocrystallization. These cases show a variation in the X-ray diffraction pattern which proves the interaction at the crystalline state. This is the case of the mixture of poly-ε-caprolactone with isotactic polypropylene and probably also with polyethylene at low density.

The absence of compatibility between the polymers forming the mixture leads to heterogeneity of the phases which negatively affects the physical and mechanical properties, which show a definite decrease reaching even lower values than those of pure polymers and moreover extremely variable.

These behaviours are emphasized when mixture of polymers which crystallize is involved. In such cases the segregation of the other component as separate phase occurs. Segregation can also occur during heat-treatments to which manufactured articles are submitted during the process. The following examples are given for clarifying purposes and not limiting the invention.

EXAMPLE 1

50 cc of anhydrous toluene and 200 cc of styrene, that had been fresh-distilled on Al-triethyl, are introduced into 1 lt glass autoclave, provided with manometer, thermometer and magnetic stirrer, in atmosphere of anhydrous nitrogen.

50 cc of anhydrous toluene, 1.5 mM of Al-triisobutyl and 0.5 mM of p.ethyltoluate (EPT) are placed separately into a tail test-tube and left to cold react for 5 minutes; then 294 mg of a supported catalyst are introduced, said catalyst being obtained according to the example 1 of the U.S. Pat. No. 4,226,741 and the whole mixture is siphoned with nitrogen into the above-mentioned autoclave containing the monomer.

The mixture is left under stirring and at room temperature for 1 minute; then a mixture formed by 50 cc of toluene, 1.5 mM of Al-triisobutyl and 0.5 mM of EPT is introduced and the whole is pressurized with propylene up to 3 atm. After 60 minutes at room temperature at constant $P_{C3-}$, the temperature is raised to 50° C. and the mixture is left to react for three hours.

After said time polymerization is stopped by methanol and 100% hydrochloric acid and 140.6 g of polymeric product with yield of 29000 g/gTi are isolated.

The product results to be extractable for 11% with methylethyl ketone (MEK) at ebullition; the residue contains 54% by weight of styrol and has $[\eta]=6$ dl/g (tetralin at 135° C.).

The product has been dissolved in alpha-chloronaphthalene and submitted to fractionated crystallization to isolate homopolymers.

The resulting copolymer had $[\eta]=2.2$ dl/g and the 13 C NMR and IR analysis confirmed its two-block nature and its composition 50/50 by weight of styrene/propylene.

It has then been molded in compression press at 270° C. for 5 minutes and then cooled in a press kept at 20° C.

On samples obtained from such foils the dynamic-mechanical spectra have been determined by means of torsional pendulum with free oscillations; the properties under traction according to ASTM 1708 Rules (condition B) and the impact strength under traction according to ASTM D 1822 Rules have also been determined.

As comparison, the data of a sample of polypropylene having $\overline{M}w=450,000$, of a test sample of isotactic polystyrene having $\overline{M}w=500,000$ and of a mixture 50/50 in weight of polystyrene/polypropylene are reported. The samples have been prepared under the same conditions as indicated for the copolymer.

The results obtained are shown in FIG. 1 and in Tables I and II. FIG. 1 is a diagram showing how the tangential G' (MPa) modulus of different samples (in ordinate) varies according to temperature variations (°C.), in abscissa). Determinations have been performed by means of torsional pendulum with free oscillations.

TABLE I

| Sample | E (MPa) | $\delta_y$ (Mpa) | $\epsilon_y$ (%) | $\delta_B$ (Mpa) | $\epsilon_B$ (%) |
|---|---|---|---|---|---|
| cop.iPP-iPS | 1100 | 29.8 | 6.2 | 26.8 | 260 |
| iPS | 1500 | — | — | 41.0 | 3.6 |
| iPP | 800 | 23.0 | 11.5 | 31.2 | 880 |
| Mixture N° 1 of example 3 | 1150 | — | — | 17.9 | 3.7 |

E = elastic modulus
$\delta_y$ = yield point
$\epsilon_y$ = yield strain
$\delta_B$ = breaking load
$\epsilon_B$ = ultimate elongation

TABLE II

| Sample | $E_B$ (KJ/m$^2$) | $\delta_B$ (Mpa) |
|---|---|---|
| cop.iPP-iPS | 49 | 25.6 |
| iPS | 12 | 9.8 |
| iPP | 30 | 22.3 |
| Mixture N° 1 of example 3 | 7 | 5.6 |

$E_B$ = breaking energy
$\delta_B$ = maximum load

EXAMPLE 2

The previously described test is repeated using n.heptane as solvent and performing the first step of polymerization for five minutes instead of one minute. After pressurization with $C_3-$ at 3 atmospheres, temperatures is raised to 50° C. and the mixture is left to react for 7 hours.

Working in the usual way, 77 g polymeric product are isolated (yield 13500 g/gTi), extractable for 14.8% with MEK at ebullition; the residue contains 23% by weight of styrene and has $[\eta]=5$ dl/g.

As indicated in the Example 1, NMR and IR analysis was carried out on the purified product. The result was a two-block copolymer with composition equal to 30% by weight of polystyrene. $[\eta]$ is 1.8 dl/g.

EXAMPLE 3

The mixtures indicated in Tables III and IV have been prepared by dissolving the polymers in ortho-dichlorobenzene at 160° C. and by precipitating with a 1:1 mixture of methanol and acetone at room temperature.

The precipitate obtained after drying has been molded in laminae according to what is described in Example 1.

Samples have been obtained from the laminae and have been submitted to impact-traction measurements according to ASTM D 1822 Rules. Microtomed small slices of said samples have been observed by means of optical microscope in polarized light and the size of the phases has been determined. The results of impact-traction test and the size of the phases are reported in Table III.

TABLE III

| N. | Mixture* cop.iPP-iPS/iPS/iPP | Size of the phase ($\mu$m) | $E_B$ (KJ/m$^2$) | $\delta_B$ (MPa) |
|---|---|---|---|---|
| 1 | 0/50/50 | 33–84 | 7 | 5.6 |
| 2 | 5/47.5/47.5 | 10–13 | 22 | 15.5 |
| 3 | 20/40/40 | 4–10 | 26 | 18.2 |
| 4 | 50/25/25 | 3–6 | 48 | 32.5 |
| 5 | 80/10/10 | 2.2–4.4 | 51 | 33.2 |

*Cop.iPP-iPS = copolymer of example 1
iPS = isotactic polystyrene of example 1
iPP = isotactic polypropylene of example 1

EXAMPLE 4

The mixtures indicated in Table IV have been prepared according to the method described in example 1 and said mixtures have been submitted to impact-traction measurement, similarly to what is described in the same example.

The results obtained are reported in Table IV.

TABLE IV

| N.* | Mixture* cop.iPP-iPS/aPS/iPP | $E_B$ (KJ/M$^2$) | $\delta_B$ (MPa) |
|---|---|---|---|
| 1 | 0/50/50 | 15 | 11.2 |
| 2 | 20/40/40 | 25 | 18.6 |

*Cop.iPP-iPS = the same as example 1
aPS = atactic polystyrene having Mw = 65.000
iPP = the same as example 1

EXAMPLE 5

The test of example 1 is repeated using toluene as solvent and performing the first step of polymerization for one minute. Dilution is carried out with an equal volume of toluene and, after addition of 1.5 nM of Al-triisobutyl and 0.5 mM of EPT, ethylene is bubbled into the solution for 60 minutes at room temperature and for three hours at 50° C.;

Working in the usual way, 90 g of polymeric product are isolated with yield of 23000 g/gTi.

The product proved to be extractable for 5% with MEK at ebullition; the residue contains 76.2% by weight of polystyrene and has $[\eta]$=7.2 dl/g (tetralin at 135° C.).

NMR, IR, DSC and X-ray analysis has been carried out on the purified product as indicated in example 1. The result was a two-block copolymer of 85/15 composition.

$[\eta]$ is 3.1 dl/g.

What we claim is:

1. Block copolymers of polypropylene and vinyl aromatic monomers, consisting of structured polymeric blocks of stereoregular polypropylene and polystyrene, respectively, each block being made of at least 50 like monomeric units each, and which block copolymer consists of 30 to 70% of said polypropylene and from 70 to 30% of said vinyl aromatic units.

2. Block copolymers of propylene with styrene according to claim 1, wherein the blocks have isotactic structure.

* * * * *